G. A. SKOOG.
UNIVERSAL PLUMB.
APPLICATION FILED OCT. 28, 1912.
1,063,473.
Patented June 3, 1913.
2 SHEETS—SHEET 2.
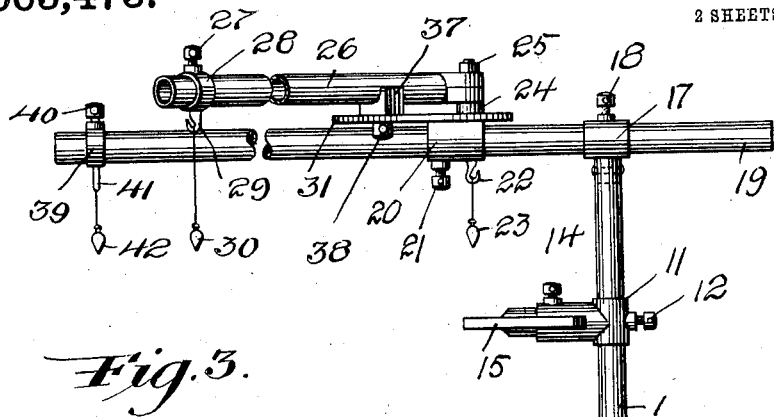
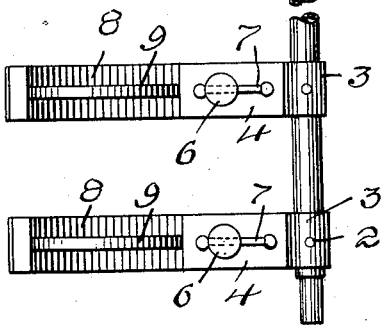
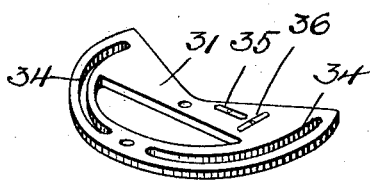
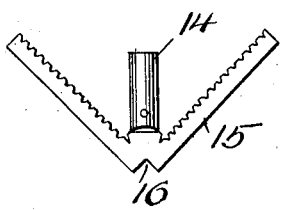
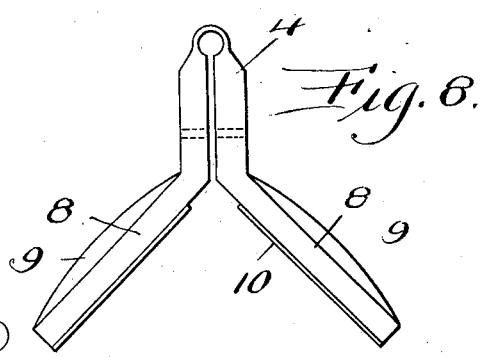
WITNESSES
INVENTOR
G. A. Skoog.
by
ATTORNEYS

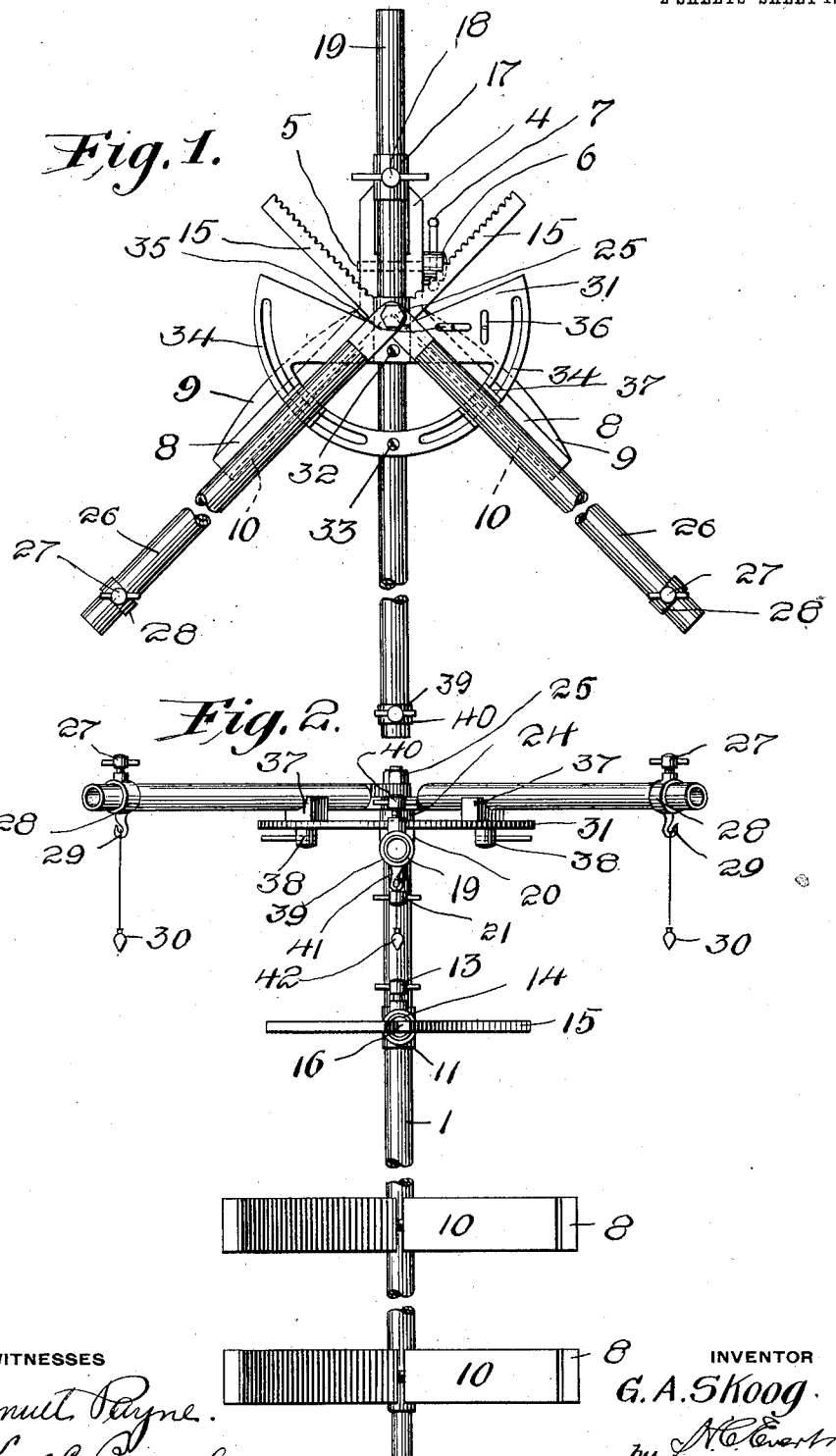

UNITED STATES PATENT OFFICE.

GUSTAF ADOLF SKOOG, OF YOUNGSTOWN, OHIO.

UNIVERSAL PLUMB.

1,063,473.    Specification of Letters Patent.    Patented June 3, 1913.

Application filed October 28, 1912. Serial No. 728,040.

*To all whom it may concern:*

Be it known that I, GUSTAF ADOLF SKOOG, a citizen of the United States of America, residing at Youngstown, in the county of Mahoning and State of Ohio, have invented certain new and useful Improvements in Universal Plumbs, of which the following is a specification, reference being had therein to the accompanying drawing.

This invention relates to universal plumbs especially designed for brick layers, masons, carpenters and other artisans.

The objects of my invention are to provide: First, an instrument of precision embodying positive and reliable means, as hereinafter set forth, for facilitating the construction of walls, columns and other structures. Second, a plumb that can be located upon one of the corners of a column whereby the other corners of a column can be accurately ascertained. Third, a plumb embodying means whereby lines can be accurately stretched and supported for the laying of a wall or any projections thereof. Fourth, an instrument that serves as a spacing device to obtain accuracy in spacing courses of bricks or other material to be laid. Fifth, an instrument that obviates the necessity of constructing several courses at the corners of walls in order to obtain guide lines for the construction of the remainder of the walls, the instrument permitting of corners and side walls being simultaneously constructed. Sixth, an instrument of the above type that is simple in construction, easy to adjust and install and highly efficient for facilitating the work of artisans.

My invention further aims to accomplish the above results by a mechanical construction that will be hereinafter specifically described and then claimed, and reference will now be had to the drawings, wherein:—

Figure 1 is a plan of a portion of the instrument, Fig. 2 is a front elevation of the same, Fig. 3 is a side elevation of the instrument, Fig. 4 is a perspective view of a detached segment, Fig. 5 is a perspective view of a detached bearing, Fig. 6 is a plan of a detached line holder, Fig. 7 is a cross sectional view of the same, and Fig. 8 is a plan of a detached clamp.

Further describing my invention in detail with reference to the drawings, wherein like numerals denote corresponding parts throughout: 1 denotes a tubular upright and mounted upon the lower ends of said upright by transverse pins 2 are the split sleeves 3 of clamping members 4, these members being located one above the other. The members are clamped upon the corner of column or wall by adjustable screws 5 having the heads 6 thereof provided with shiftable handles 7. The clamping members 4 have angularly disposed arms 8 reinforced by ribs 9 and provided with yieldable contact pads 10. The arms 8 are at right angles to one another and can be easily clamped upon the corner of a column or walls without any danger of the side arms injuring the bricks or material to which they are connected.

11 denotes a T slidably mounted upon the upright 1, above the clamping members, and adjustably held thereon by a set screw 12. Adjustably mounted in the T 11 by a set screw 13 is the stem 14 of a V-shaped line holder 15, said line holder having right angularly disposed notched arms to which one or more lines (not shown) can be easily and quickly attached. The line holder presents a V-shaped notch 16 that coöperates with a plumb bob, to be hereinafter referred to.

17 denotes a T mounted in the upper end of the upright and provided with a set screw 18 for adjustably holding a cylindrical or tubular beam 19 positioned at right angles to said upright.

20 denotes a bearing slidably mounted upon the beam and adjustably held thereon by a set screw 21. The bearing is provided with a depending hook 22 and suspended from said hook is a plumb bob 23 adapted to vertically aline with the notch 16 to determine the vertical outer edge of the corner of walls or a column to be constructed that has the outer edges thereof determined by lines held by the holder 15. The bearing 20 has a stud 24 and swiveled upon said stud by a screw bolt 25 are the apertured inner ends of tubular angularly disposed arms 26. Adjustably mounted upon said arms by set screws 27 are sleeves 28 for depending hooks 29 provided with plumb bobs 30.

31 denotes a segment secured to the bearing 20 by a screw 32 or other fastening means, said segment being also secured to a supporting block resting on the beam 19 by a screw 33 or other fastening means. The segment has segment slots 34 and levels 35 and 36 to determine when the segment and the beam 19 are level relatively to a piece of work.

37 denotes supports for the arms 26, said supports having shanks 38 extending into the slots 34 for guiding a movement of said supports that rest upon the segment 31.

39 denotes a sleeve adjustably mounted upon the beam 19 by a set screw 40, said sleeve having a depending hook 41 provided with a plumb 42.

The instrument as above set forth can be easily clamped on the corners of walls and in case of any obstruction inside the wall interfering with the beam 19, said beam can be withdrawn so that it does not extend inside the wall. In this instance the arms 26 and the segment are removed and simply the plumb bob 42 employed to locate the line holder. The plumb bob 42 coöperates with the plumb bobs 30 and 23 in locating the four corners of a column, the instrument being fastened to one corner of the column, the plumb bob 23 locating the corner to which the instrument is attached, the plumb bob 42 locating the corner opposite that located by the plumb bob 23, and the plumb bobs 30 locating the other corners of the column.

From the foregoing it will be observed that the instrument has a two-fold purpose. First, that of serving as a support for one or more lines used as a guide for laying a wall or projections thereof. Second, as a spacing device to obtain accuracy in spacing courses, which is accomplished by raising the line holder upon the upright a predetermined distance to bring the line or lines to a level required for a course of bricks or stones. The adjustable arms 26 are only used when constructing columns whereby the location of four corners at once is desired, or on walls whereby the corner is greater or less than 90 degrees. In cases of long walls other means than the clamping members can be resorted to for supporting the instrument and provision can be made for intermediate supports for long lines between corners.

While in the drawings there is illustrated a preferred embodiment of my invention, it is to be understood that the structural elements are susceptible to such variations and modifications as fall within the scope of the appended claims.

What I claim is:—

1. An instrument of the type described comprising an upright, clamping members adapted to support said upright, a V-shaped notched line holder adjustably mounted upon said upright, a beam adjustably supported by the upper end of said upright at right angles thereto, a bearing adjustably mounted upon said beam, a sleeve adjustably mounted upon said beam, plumb bobs supported by said sleeve and said bearing, arms supported by said bearing, and plumb bobs adjustably supported by said arms.

2. An instrument of the type described comprising an upright, an adjustable line holder supported by said upright, an adjustable beam positioned upon the upper end of said upright at right angles thereto, a bearing adjustably mounted upon said beam, a segment mounted upon said bearing, arms pivotally mounted above said segment and guided thereby, and adjustable plumb bobs suspended from said beam and said arms.

3. An instrument of the type described comprising an upright, an adjustable line holder supported by said upright, an adjustable beam positioned upon the upper end of said upright at right angles thereto, a bearing adjustably mounted upon said beam, a segment mounted upon said bearing, arms pivotally mounted above said segment and guided thereby, adjustable plumb bobs suspended from said beam and said arms, and means connected to said upright and adapted to support said upright relatively to a piece of work.

4. An instrument of the type described comprising an upright, a line holder adjustably connected thereto, a beam adjustably connected at the upper end of said upright, a bearing adjustably mounted upon said beam, a plumb bob suspended therefrom and adapted to coöperate with said line holder, a segment carried by said bearing, arms pivotally supported above said segment and guided thereby, and plumb bobs adjustably suspended from said arms and said beam.

5. An instrument of the type described comprising an upright, a line holder adjustably connected thereto, a beam adjustably connected at the upper end of said upright, a bearing adjustably mounted upon said beam, a plumb bob suspended therefrom and adapted to coöperate with said line holder, a segment carried by said bearing, arms pivotally supported above said segment and guided thereby, plumb bobs adjustably suspended from said arms and said beam, and clamping members adapted to hold said upright relatively to a piece of work.

In testimony whereof I affix my signature in the presence of two witnesses.

GUSTAF ADOLF SKOOG.

Witnesses:
M. R. COLEMAN,
MAX H. SROLOVITZ.